US010081496B2

(12) United States Patent
Bacallao et al.

(10) Patent No.: US 10,081,496 B2
(45) Date of Patent: Sep. 25, 2018

(54) SELF-CHECKOUT REGISTER CONFIGURATIONS

(71) Applicant: Walmart Stores, Inc., Bentonville, AR (US)

(72) Inventors: Yurgis Mauro Bacallao, Centerton, AR (US); Joshua David Osmon, Bentonville, AR (US)

(73) Assignee: WALMART APOLLO, LLC, Bentontille, AR (US)

( * ) Notice: Subject to any disclaimer, the term of this patent is extended or adjusted under 35 U.S.C. 154(b) by 0 days.

(21) Appl. No.: 15/622,136

(22) Filed: Jun. 14, 2017

(65) Prior Publication Data

US 2017/0355531 A1 Dec. 14, 2017

Related U.S. Application Data

(60) Provisional application No. 62/349,940, filed on Jun. 14, 2016, provisional application No. 62/349,933, filed on Jun. 14, 2016.

(51) Int. Cl.

| | |
|---|---|
| ***A47F 10/02*** | (2006.01) |
| ***B65G 43/10*** | (2006.01) |
| ***G07G 1/00*** | (2006.01) |
| ***A47F 9/04*** | (2006.01) |

(52) U.S. Cl.

CPC .............. *B65G 43/10* (2013.01); *A47F 9/042* (2013.01); *A47F 9/047* (2013.01); *G07G 1/0072* (2013.01)

(58) Field of Classification Search

CPC .. A47F 9/04; A47F 9/042; A47F 9/047; A47F 9/005; B65G 21/00; B65G 41/00; B65G 43/00; B65G 43/10; B65G 49/00; G07G 1/0018; G07G 1/0072

See application file for complete search history.

(56) References Cited

U.S. PATENT DOCUMENTS

| | | | | |
|---|---|---|---|---|
| 2,884,094 | A * | 4/1959 | Roy | 186/1 |
| 3,902,570 | A | 9/1975 | Close | |
| 4,703,151 | A | 10/1987 | Sakamoto | |
| 5,131,499 | A * | 7/1992 | Hoar | B65B 67/04 186/66 |
| 5,816,419 | A * | 10/1998 | Lamson | A47F 5/00 211/150 |
| 6,491,218 | B2 | 12/2002 | Nguyen | |
| 6,550,583 | B1 * | 4/2003 | Brenhouse | A63F 9/02 186/66 |

(Continued)

FOREIGN PATENT DOCUMENTS

CA 2714538 A1 3/2012

OTHER PUBLICATIONS

"Grocery checkstands catalog", PanOston.com, 2011, revised Oct. 2012; 47 pages.

(Continued)

*Primary Examiner* — Mark J Beauchaine

(74) *Attorney, Agent, or Firm* — Schmeiser, Olsen & Watts LLP

(57) ABSTRACT

A self-checkout system comprises a register belt station; an itemization station downstream from the register belt station; and a bagging station downstream from the itemization station. The register belt station, an itemization station, and bagging station are each modular and removably coupled to each other.

14 Claims, 8 Drawing Sheets

(56) References Cited

U.S. PATENT DOCUMENTS

| | | | | |
|---|---|---|---|---|
| 6,793,043 | B2 | 9/2004 | Nguyen | |
| 7,114,650 | B2 | 10/2006 | Sherrod | |
| 7,516,820 | B1 | 4/2009 | Cox et al. | |
| 7,578,440 | B2 | 8/2009 | Ulrich et al. | |
| 7,866,546 | B1 | 1/2011 | Vance | |
| 2003/0141367 | A1* | 7/2003 | Lucera et al. | G06K 7/10 235/462.4 |
| 2004/0041021 | A1* | 3/2004 | Nugent | G06K 15/00 235/383 |
| 2005/0114216 | A1 | 5/2005 | Lantz | |
| 2007/0205277 | A1 | 9/2007 | Tashiro | |
| 2011/0266092 | A1 | 11/2011 | Marquis et al. | |
| 2012/0055982 | A1 | 3/2012 | Edwards | |
| 2012/0061150 | A1 | 3/2012 | Coulombe et al. | |

OTHER PUBLICATIONS

Cushman Communications, "Cushman(TM) Refresher(R) Family", YouTube.com, Jan. 15, 2016, (3 pages).

"Pull-Out Trash Can Cabinet", CliqStudios.com, accessed Jun. 7, 2016; 3 pages.

"19 in. H×11 in. W×22 in. D Single 35 Qt. Pull-Out Brushed Aluminum and White Waste Container", HomeDepot.com, accessed Jun. 7, 2016; 2 pages.

ValentinoDesigns "Reclaimed Barn Wood Kitchen Island with Drawers cabinet Slide Out Trash Can Shelf Breakfast bar 48×35×26", Etsy.com, accessed Jun. 2, 2016; 2 pages.

Examiner's Report in Canadian Application for Industrial Design No. 171721, dated Mar. 3, 2017; 10 pages.

Invitation to Pay Additional Fees in International Patent Application No. PCT/US17/37359, dated Aug. 15, 2017; 2 pages.

ntemational Search Report & Written Opinion in International Patent Application No. PCT/US17/37359, dated Oct. 31, 2017; 11 pages.

Non-Final Office Action in U.S. Appl. No. 15/622,146, dated Oct. 23, 2017; 13 pages.

Final Office Action in U.S. Appl. No. 15/622,146, dated Mar. 13, 2018; 15 pages.

Notice of Allowance in U.S. Appl. No. 15/622,146 dated May 21, 2018; 7 pages.

* cited by examiner

SELF-CHECKOUT REGISTER CONFIGURATIONS

RELATED APPLICATIONS

This application claims the benefit of U.S. Provisional Patent No. 62/349,940, filed Jun. 14, 2016, entitled "Self-Checkout Register Configurations," and U.S. Provisional Patent No. 62/349,933 filed Jun. 14, 2016, entitled "Modular Bagging Stations," the contents of each of which are incorporated by reference herein in their entireties.

BACKGROUND OF THE INVENTION

Technical Field

The present inventive concepts relate to bagging stations used in retail stores and, more specifically, to interchangeable modules of a self-checkout system.

State of the Art

Self-checkout stations at a retail store permit customers to process their store purchases in lieu of a traditional cashier-staffed checkout counter.

SUMMARY

In one aspect, provided is a self-checkout system comprising: a register belt station; an itemization station downstream from the register belt station; and a bagging station downstream from the itemization station, wherein the register belt station, the itemization station, and the bagging station are each modular and removably coupled to each other.

In one aspect, provided is a self-checkout system comprising: a register belt station; and a merchandise display rack coupled to the register belt station that folds in the register belt station to increase an available surface area under the register belt station when not in use.

In another aspect, provided is a method for assembling a self-checkout system, comprising: coupling a register belt station to one side of an itemization station; and coupling a bagging station to another side of the itemization station, wherein an item transfer path extends from the register belt station to the bagging station via the itemization station.

DETAILED DESCRIPTION OF EMBODIMENTS OF THE INVENTION

Figure 1A:
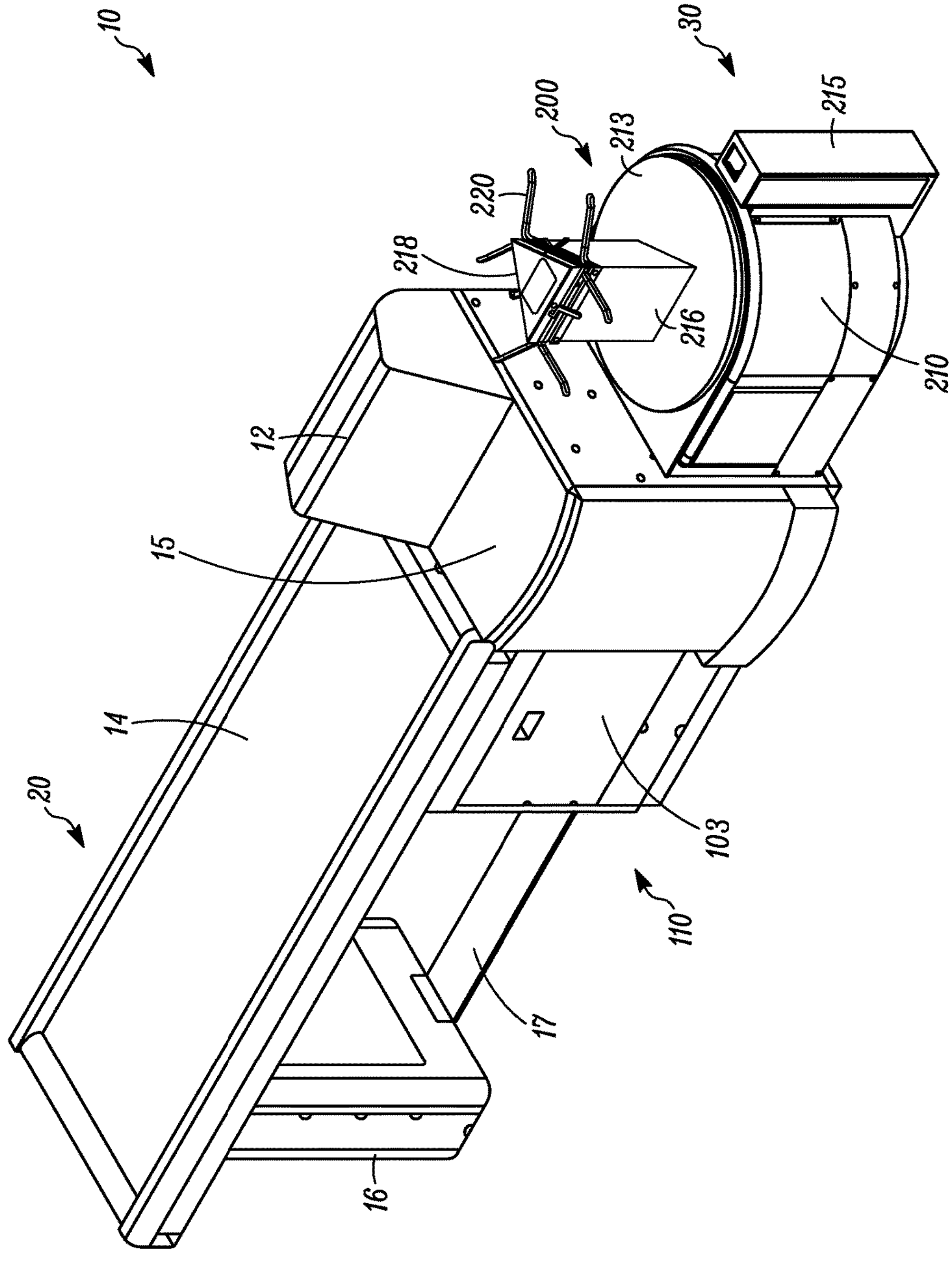
FIG. 1A shows a perspective view of an assembled self-checkout system, in accordance with some embodiments.
Figure 1B:
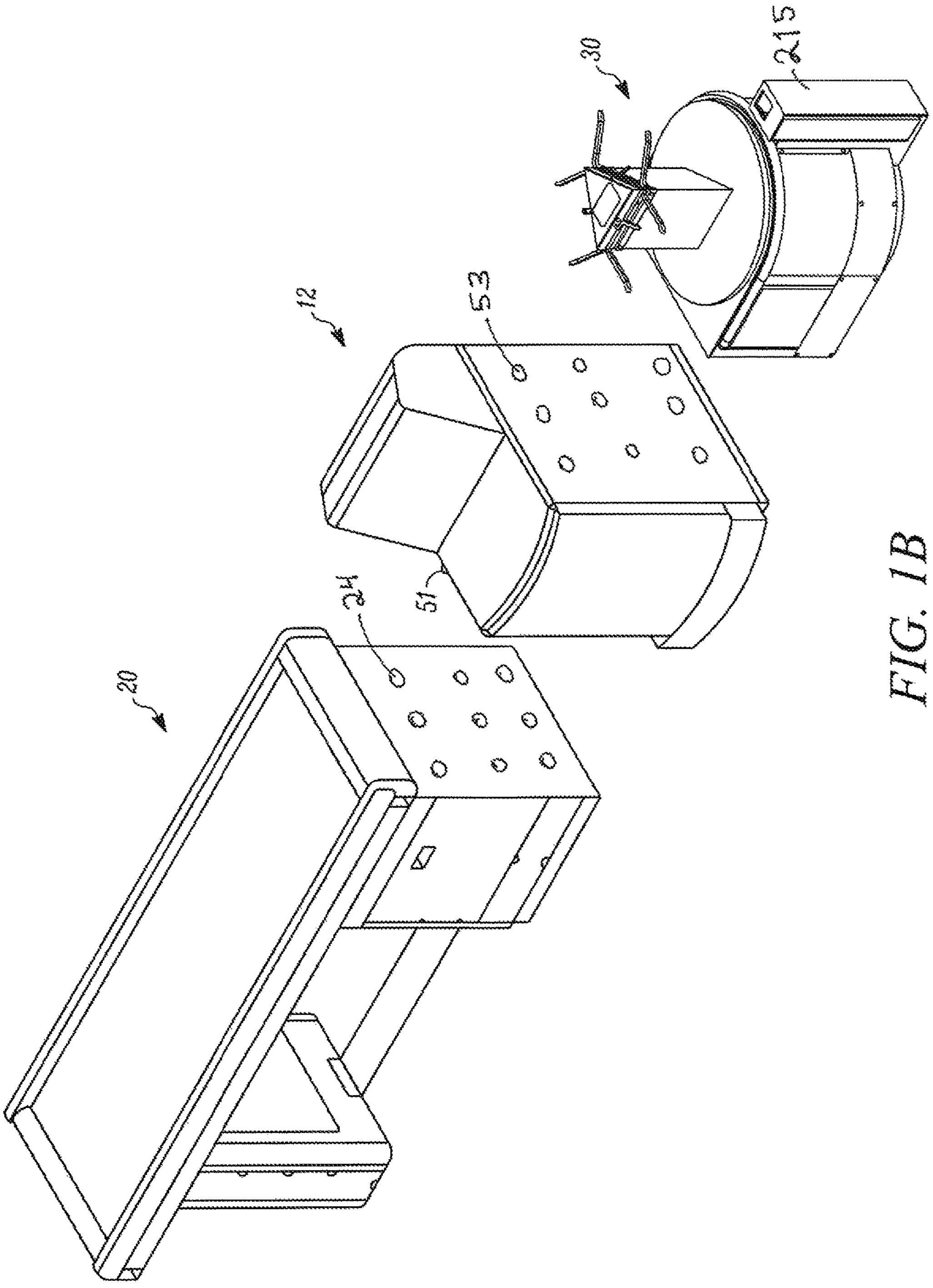
FIG. 1B shows a perspective view of modular elements of the self-checkout system separate from each other, in accordance with some embodiments.
Figure 2:
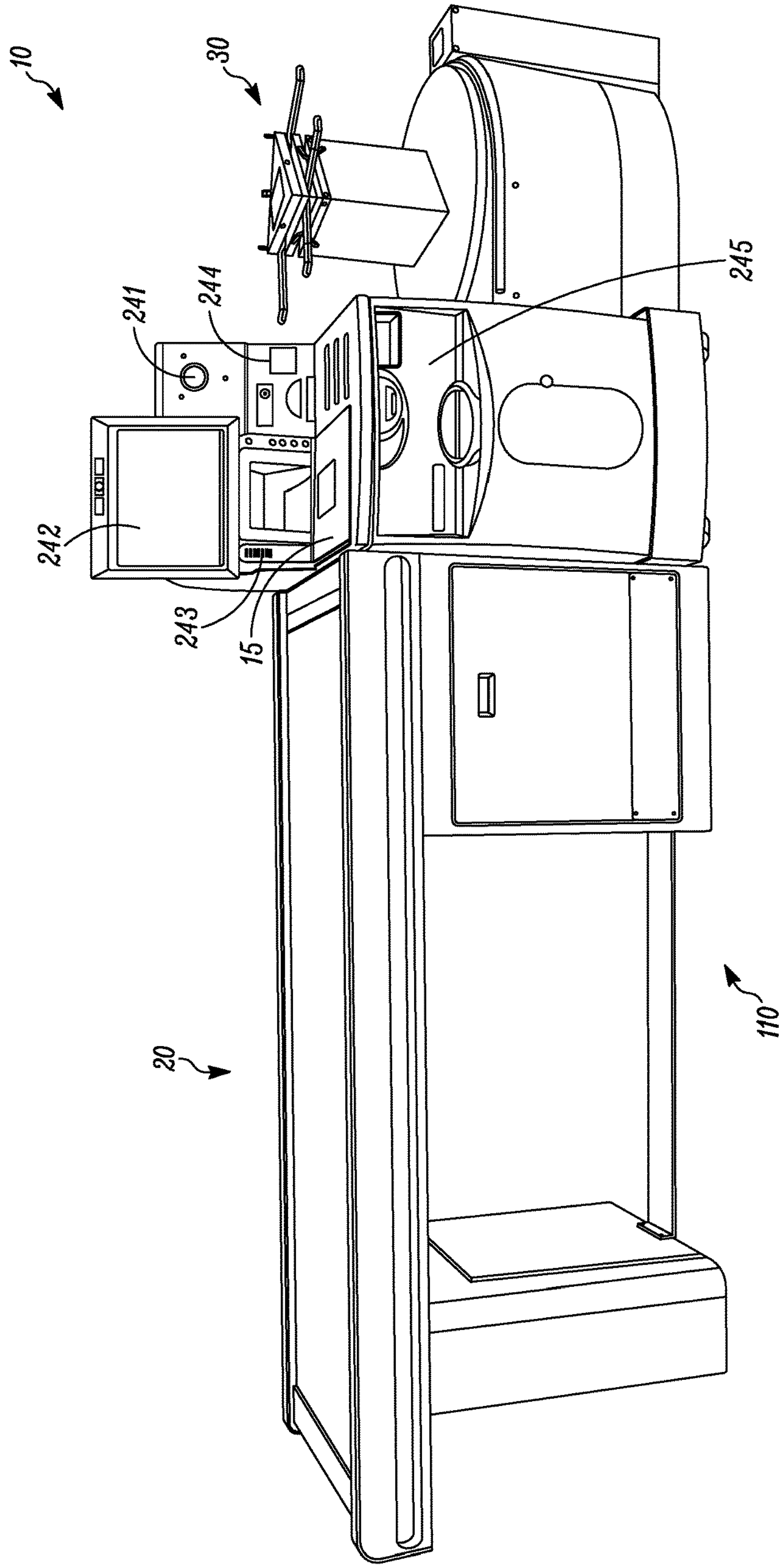
FIG. 2. shows a front view of a self-checkout system, in accordance with some embodiments.

FIGS. 1A, 1B, and 2 show various views of a self-checkout system 10, in accordance with some embodiments. The self-checkout system comprises a register belt station 20, an itemization station 12, and a bagging station 30, which are each modular and removably coupled to each other.

The register belt station 20 may be the same or similar to that described with reference to U.S. Provisional Patent Application No. 62/295,866, entitled Waste Collection System and Method," incorporated by reference herein in its entirety.

Figure 3:
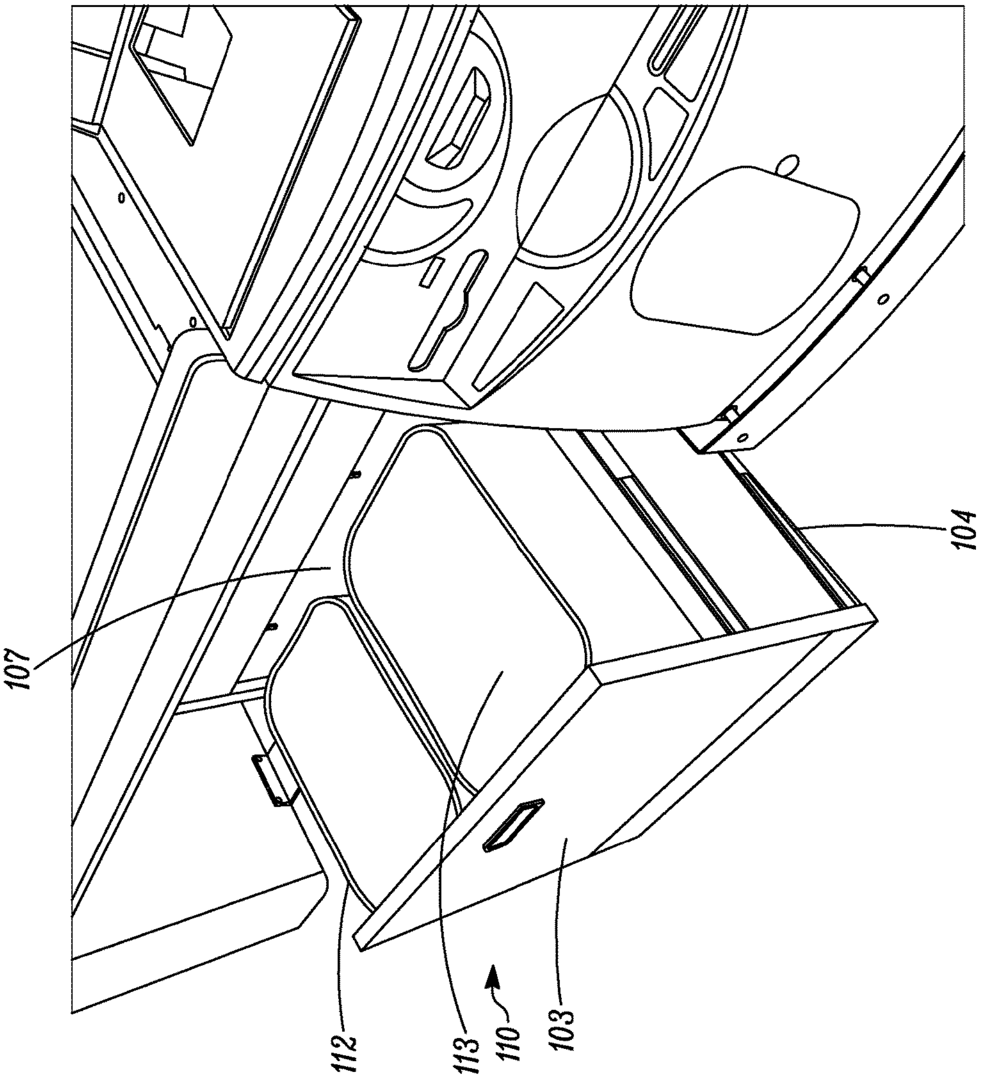
FIG. 3 shows a perspective view of a garbage collection system of a self-checkout system in an open position, in accordance with some embodiments.

The register belt station 20 may include a register belt 14, a checkout counter body 16, and a garbage collection system 110 under the register belt 14. The garbage collection system 110 may be self-contained, and as shown in FIG. 3, and may include a housing or frame comprising a first side, a second side, and a back wall collectively forming an interior. A door 103 is positioned at an opening to the interior 107 of the housing. The door 103 may include a handle for opening and/or closing the door 103. At least a portion of the door 103 may include a layer or coating of material 108, such as metal, plastic, or chemical compound, for example, providing a scratch or damage-resistant guard.

The housing portion and door 103 may be formed of one or more materials sufficient for supporting the weight of garbage bins 112, 113 and their contents, for example, wood, metal, plastic or related composites, or a combination thereof. The housing portion and/or door 103 may be coated with a material to match the color, texture, material, and/or other features of the checkout system 10, for example, the register belt station 20 to which the housing portion is coupled.

The garbage collection system 110 may include a set of rails 104, ball bearing slides, or the like, for permitting a trash bin housing unit and door 103 to slide linearly relative to the interior of the housing portion 102. The rails 104 may be formed of metal and/or other material with withstanding the weight of one or both garbage bins 112, 113 filled with trash, recyclable material, and so on. The garbage bins 112, 113 may be positioned in the trash bin housing unit 115, which turn is positioned on the pair of sliding rails 104, so that the trash bin housing unit 115 extends and retracts when needed. For example, when retracted, the trash bin housing unit 115 is positioned in the interior 107 of the housing portion 102. When extended as shown in FIG. 3, the garbage bins 112, 113 are exposed so that trash, recyclable materials, and so on may be placed in the garbage bins 112, 113. One of the garbage bins 112, 113 may provide a compartment for holding trash and the other of the bins 112, 113 may provide a compartment for holding empty hangers and/or other recyclable material. The garbage bins 112, 113 may be off-the-shelf garbage cans, pails, buckets, or other holding accessory, for example, formed of plastic, stainless steel, or other well-known materials. Although two bins 112, 113 are shown and described, other embodiments include a single bin, or more than two bins. The bins 112, 113 may be the same size or be of different sizes. In some embodiments, The garbage collection system 100 includes fixture attachments (not shown) for coupling to the register belt region 20.

In some embodiments, the retail store checkout counter serves as a hybrid register, for sorting garbage from recyclables such as hangers, plastic bags etc. at the checkout counter. The garbage collection system can be constructed and arranged for one or more of garbage collection, recyclable collection, hangers collection, returns collection (for example, bottles, cans, and so on), or anything else having a size and configuration for insertion into one or both bins 112, 113.

The register belt station 14 may include coupling elements such as bolts, clips, male/female connectors, or the like for coupling with the itemization station 12. In some embodiments, the register belt station 14 is not directly coupled to the itemization station 12, but instead, each of the register belt station 14 and itemization station 12 are positioned next to each other and individually held in place, of example, each having foot clamps, screws, bolts, or other coupling devices for securing the register belt station 14 and itemization station 12 to the floor. When coupled together and/or individually positioned in a stationary position, during operation, the belt 14 in motion can direct items downstream to the itemization station 12.

The itemization station 12 can include a scanning device for scanning items, for example, scanning barcodes, universal product code (UPC) and so on that are identified with the item to be purchased.

The itemization station 12 may also include a product scale 15 in communication with the scanner. Store items can be delivered to the product scale 15 from the belt 14. The product scale 15 may be used to determine the weight of the item. The determined weight may be compared with a weight determined by another scale, for example, a security scale, downstream from the itemization station 12, for example, shown in FIG. 4.

In addition to the product scale 15 and scanning device, the itemization station 12 may include, but not be limited to, an interactive customer interface terminal electrically coupled to the scanner, an electronic payment terminal, credit card, bill, and/or coin detector and processor, printer, receipt generator, item sensors, point of sale (POS) terminal or related computer having a display, processor, memory, input/output devices, and so on, optical bar code scanner, printer, electronic payment processing device, cash tray, and credit card processing module (not shown).

As described above, one side of the itemization station 12 may include coupling elements 51 such as bolts, clips, male/female connectors, or the like for coupling with the register belt station 20, for example, mating with corresponding connectors 24 at a sidewall of the register belt station 20. Another side of the itemization station 12 may likewise include coupling elements 53 such as bolts, clips, male/female connectors, or the like for coupling with the modular bagging station 30 downstream from the itemization station 12. In some embodiments, the bagging station 30 is not directly coupled to the itemization station 12, but instead, each of the bagging station 30 and itemization station 12 are positioned next to each other and individually held in place, for example, each having foot clamps, screws, bolts, or other coupling devices 51 for securing the bagging station 30 and itemization station 12 to the floor. When coupled together and/or individually positioned in a stationary position, during operation, items can be directed downstream to the bagging station 30 from the itemization station 12 without a physical obstacle along the transport path.

The modular bagging station 30 may include a modular interchangeable bagging station portion 200 and a base 210. A region of the bagging station 30 may include a fixture 215, or electrical housing, for providing most or all of the electrical connections throughout the bagging station 30 and/or other elements of the self-checkout counter, such as the itemization station 12 and register belt station 20. In some embodiments, the electrical housing 215 provides electrical connections and distributes electricity to some or all of the bagging station 30, the itemization station 12, and the register belt station 20, for example, to power a motor at one or more of the bagging station 30, the itemization station 12, and the register belt station 20. In other embodiments, the electrical components for distributing electricity are located inside the base 210, itemization station 12, or belt station 14. In some embodiments, electrical housing 215 receives power from a power cord hanging from the ceiling. In other embodiments, electrical housing 215 receives power from a power box in the floor. As shown in FIGS. 1A, 1B, and 2, the bagging station portion 200 is positioned on a base 210. In other embodiments, as shown and described with reference to the bagging station 30A of FIG. 4, the bagging station portion 200 is positioned on a scale platform 260. Each of the belt station 20, itemization station 12, and bagging station 30 may include openings in their sidewalls so that cables, power cords, and the like may pass through them. For example, the itemization station 12 may include a first opening in one sidewall facing the bagging station 30 and a second opening in another sidewall facing the belt station 20 so that the itemization station 20 receives a power cord from the electrical housing 215 and provides a pass-through channel for the power cord to the belt station 20 for providing power to the belt station 20. In some embodiments, the itemization station 12 may include switches or other intervening electronic devices for exchanging power, data signals, or the like, between the bagging station 30 and the belt station 20.

In some embodiments, a motor (not shown) is positioned on one end of the assembled self-checkout system 10, for example, at a region of the checkout counter body 16 on which the belt 14 operates. The power source for the motor is at the other end of the assembled self-checkout system 10, for example, at the electrical housing 215. A cable, conduit, or the like, extends through sidewalls in each of the of the belt station 20, itemization station 12, and bagging station 30 to electrically couple with the motor. In a related embodiment, the motor at the one end of the system 10 may be used to rotate a carousel of the bagging station portion 200.

Base 210 supports bagging station portion 200, allowing bagging station 200 to rotate. Base 200 couples to itemization station 12.

The bagging station portion 200 may include a carousel top 213, a center piece 216, and a plurality of bag holding elements 220 extending from the center piece 216. In some embodiments, the carousel top 213 rotates, and the center piece 216 sets on the carousel top 213. Carousel top 213 may serve as a table to hold center piece 216, and is a means to support one or more shopping bags, for example, plastic or paper bags, a bag is being filled with store items for purchase.

In some embodiments, the carousel top 213 may rotate due to a bearing plate (not shown) or the like that permits the carousel top 213 to rotate relative to the stationary base 210. In some embodiments, the carousel top 213 may rotate by manual movement, or automatically. For example, the carousel top 213 may rotate in connection with a movement of the conveyor belt 14, or automatically rotate after the itemization station 12 initiates a checkout process. A special purpose processor, for example, located in a computer at the itemization station 12, may be programmed to establish a timing between the rotation of the belt 14, the checkout process performed at the itemization station 12, and the rotation of the carousel top 213. For example, after the processor receives a data signal that an item for purchase is placed on the product scale 15 of the itemization station 12, the processor may send an instruction to a motor to initiate rotation of the carousel 213. Such electrical and/or data connections between the belt station 20, itemization station 12, and bagging station 30 may be formed in a seamless manner after assembly of the system 10. For example, when the modular belt station 20, itemization station 12, and bagging station 30 are coupled to each other, e.g., via connectors 24, 53 shown in FIG. 1B, these connectors may include electrical and/or data connectors that form electrical and/or data paths between the modular components of the system 10.

In some embodiments, center piece 216 has three sides, or a triangular configuration. In some embodiments, center piece 216 has more than three sides, and top surface 218 is a shape other than triangular, such as rectangular, round, oval, or other shape.

The bag holding elements 220 may include hooks, rods, clamps, spring clips or other extensions for holding a shopping bag and its contents. A shopping bag may be paper, plastic, recyclable material, and/or other well-known material. The elements 220 may include bag upper edge holders that grasp the upper edge of an open bag in order to hold the bag open and in place while items are placed in the bag so the bag can be filled. The bag holding elements 220 and/or bag edge holders may be of various sizes and shapes for supporting the weight of a shopping bag filled with store items. In some embodiments, the bag holding elements 220 may be removable, for example, removed from the top portion 218 of the center piece 216 and replaced with different the bag holding elements.

Figure 4:
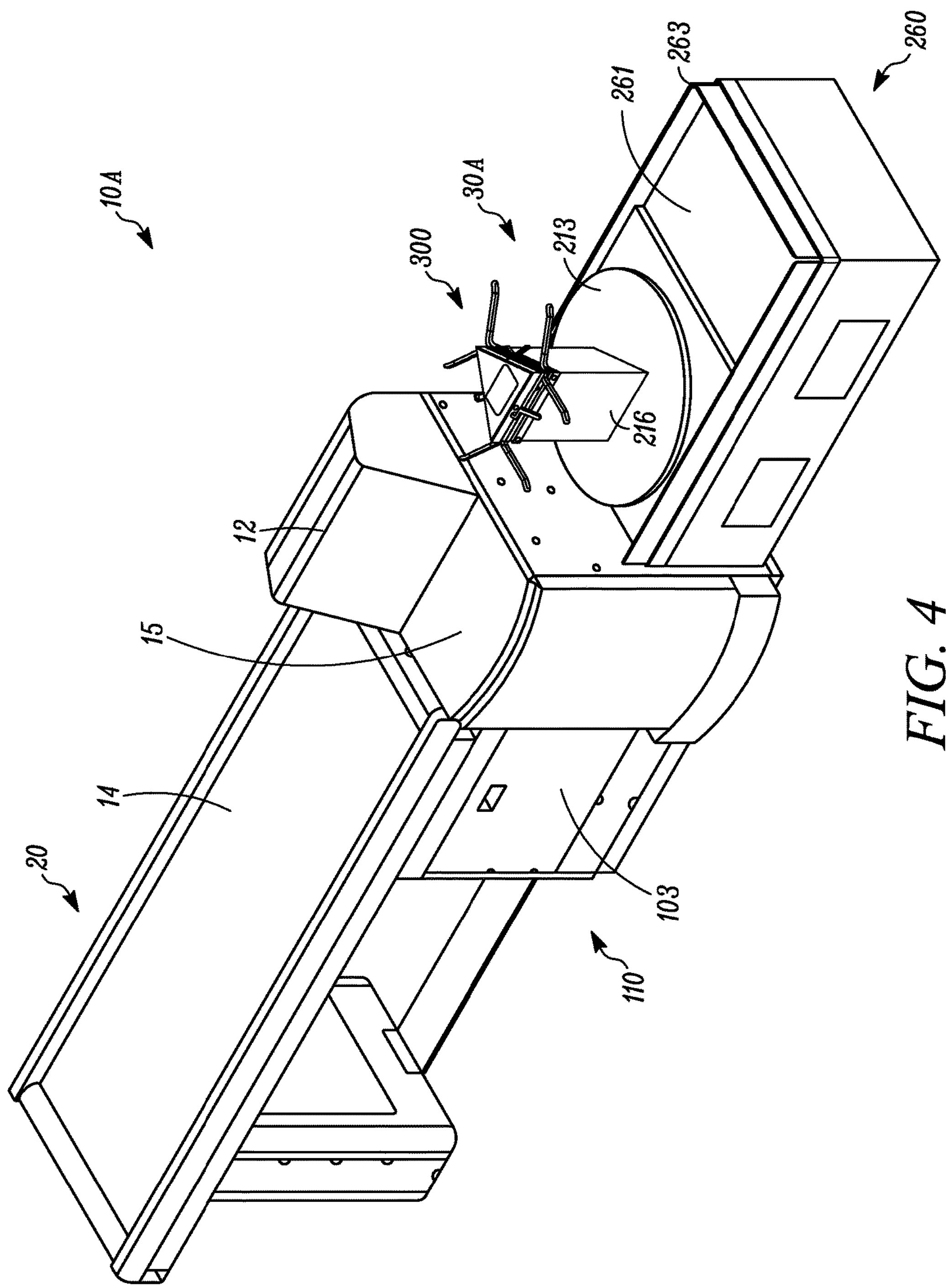
FIG. 4 shows a perspective view of an assembled self-checkout system, in accordance with some embodiments.
Figure 5:
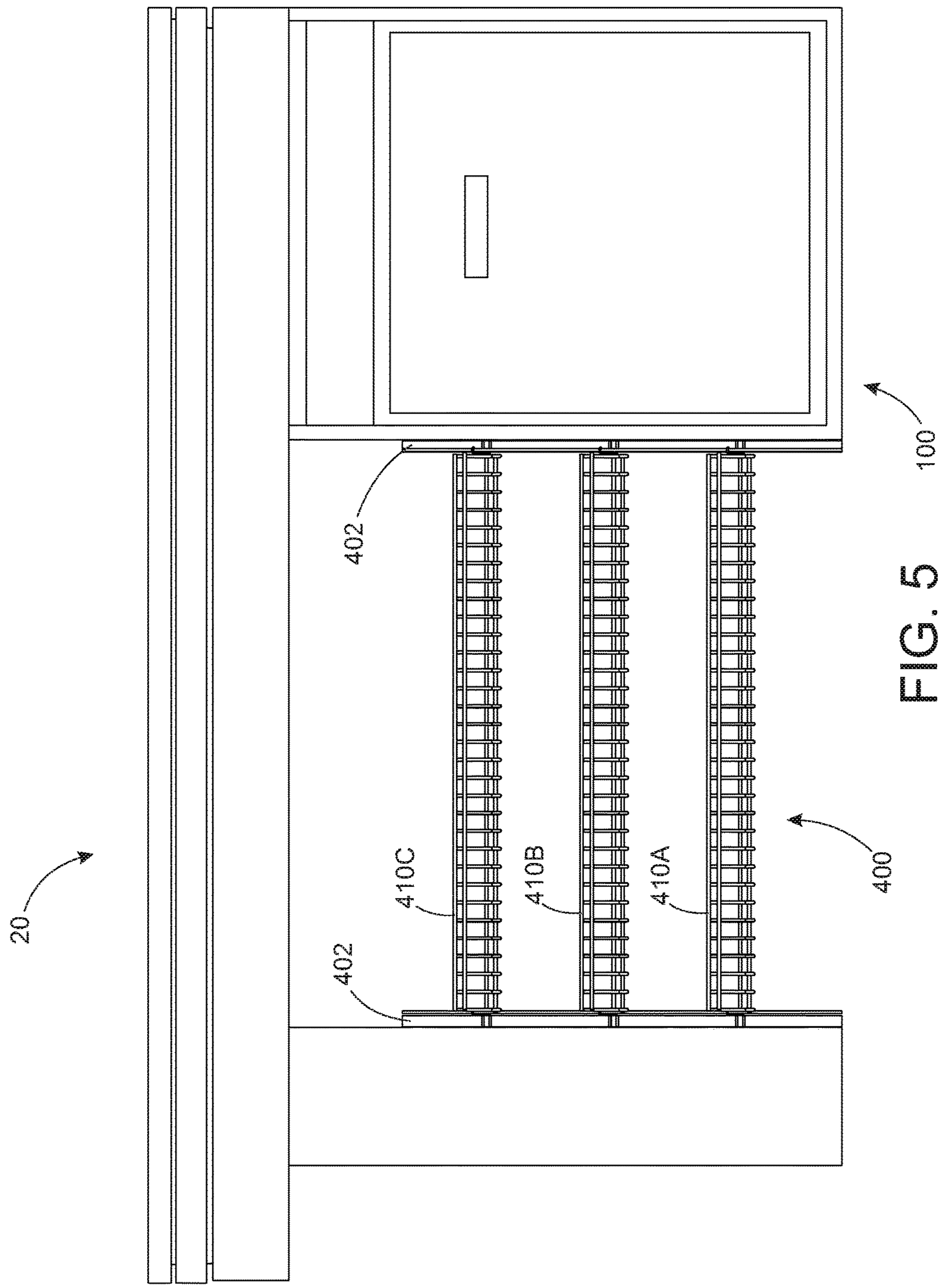
FIG. 5 shows a perspective view of a merchandise display rack positioned under a register belt station of a self-checkout system, in accordance with some embodiments.

FIG. 4 shows a perspective view of an assembled self-checkout system 10A, in accordance with other embodiments. The assembled self-checkout system 10A of FIG. 4 is similar to the self-checkout system 10 of FIGS. 1A-3, except that a different modular bagging station 30A is coupled to the itemization station 12.

The modular bagging station 30A may include a bagging station portion 300 that is the same as or similar to the bagging station portion 200 described with reference to FIGS. 1-3. As shown in FIG. 4, the modular bagging station portion 300 is constructed and arranged to communicate with a self-checkout register scale platform 260. In the embodiment shown in FIG. 4, modular bagging station 300 rests on scale platform 260. The scale platform 260 may function as an antitheft scale. A central database (not shown) in electrical communication with a processor of the scale platform 260 may store the standard weight of each grocery item scanned at itemization station 12. The item weight may be predetermined, or weighed by another scale as part of the checkout process, for example, during the scanning and payment portions of a scanning process. An alarm or other notification may be sounded if the added weight does not match the item that was scanned.

As shown in FIG. 4, in some embodiments, the scale platform 260 includes a top surface 261 on which items may be placed and weighed. A portion of top surface 261 may be configured to mate with the modular bagging station 300, for example, the top surface of the scale platform 260 may include an opening to receive the carousel top 213, which may rotate about the top surface of the scale platform 260.

The weight of the bagging station portion 300 is predetermined and subtracted by a weight calculator when weighing a combination of store items to determine whether or not the purchase is correct. For example, the product scale 15 of the itemization station 12 may perform a first weight on one or more items, which is compared to a weight of the one or more items received downstream from the product scale 15 and determined by the scale platform 260, e.g., items placed in shopping bags positioned on the bagging station 30A. The weight data is calculated to be within a predetermined threshold of the scale 260.

In some embodiments, the scale platform 260 top surface 261 includes a lip 263, on which items may be placed and weighed. A portion of top surface 261 may be configured to mate with the metal base, for example, the top surface 261 of the scale platform 260 may include an opening to receive the carousel top 213, which is constructed to rotate about the scale platform 260. In other embodiments, the lip 263 may be provided with no corresponding metal bottom. Here, the lip 263 may be coupled directly to the sides of the scale platform 260, while the carousel top 213 is positioned directly on the scale platform 160.

FIGS. 5-7B illustrate a feature of the register belt station 20, in accordance with some embodiments. In brief overview, a merchandise display rack for a self checkout counter, comprises at least one rack portion extending in a longitudinal direction between a first wall and a second wall of the self checkout counter; a first pin that extends through a hole at the first wall; and a second pin that extends through the hole in the second wall. The first and second pins and the two holes extend along a same axis in the longitudinal direction. The rack portion is configured to pivot about the axis along which the first and second pins extend. A mounting bracket may be coupled to each of the first wall and the second wall that extends in a vertical direction perpendicular to the longitudinal direction. The mounting bracket including the first and second holes for receiving the first and second pins, or related couplers. Each mounting bracket has two additional holes for screws or the like to couple the mounting bracket to the first or second wall. The display rack may be coupled to a front or rear section of the self checkout counter, or positioned under a conveyor belt of the checkout counter. The display rack has a scissor-like configuration to fold/collapse when not in use. The merchandise display rack may further comprise a support center bar and two support hooks for locking the rack portion in a close position.

For example, register belt station 20 includes a merchandise display rack 400 positioned under the register belt section 20, in accordance with some embodiments. Although a modular register belt station 20 of FIGS. 1-4 is shown, other embodiments may equally apply where a standalone register belt station is provided, or the belt station is part of a larger physical station, i.e., not modular. The display rack 400 may have dimensions suitable for positioning and operation under a self-checkout counter belt region. In some embodiments, the display rack 400 is about 39½ inches long, 26 inches high, and 8 inches in depth, but not limited thereto.

The merchandise display rack 400 includes a plurality of wire shelves 410A-C (generally, 410), each of which is rotatably coupled to mounting brackets 402 which in turn are coupled to inner sidewalls of the register belt section 20, or directly coupled to inner sidewalls of the register belt section 20. In particular, each shelf 410 may have a pin or the like that protrudes from a bottom region of the shelf 410 for insertion into a mounting hole 403 in the mounting bracket 402, and can rotate inside the mounting hole 403 to allow the shelf 410 to expand or contract, for example, shown in FIGS. 7A and 7B. The shelves 410 may be parallel each other, and extend from a top region to a bottom region of an interior space in the belt station 20, for example, between legs of the belt station 20. The shelves are preferably equally spaced, for example, about 7 inches from each other, so that they do not impeded with each other when the rack 400 is placed in closed state, for example, shown in FIG. 7B. In some embodiments, the mounting bracket 402 may have another mounting hole for accommodating a support element of the shelf checkout counter. Each shelf 410 may include a front and back lip, or region extending perpendicular to the bottom, or tray, region of the shelf 410 to prevent items from falling off the shelf 410.

Figure 7A:
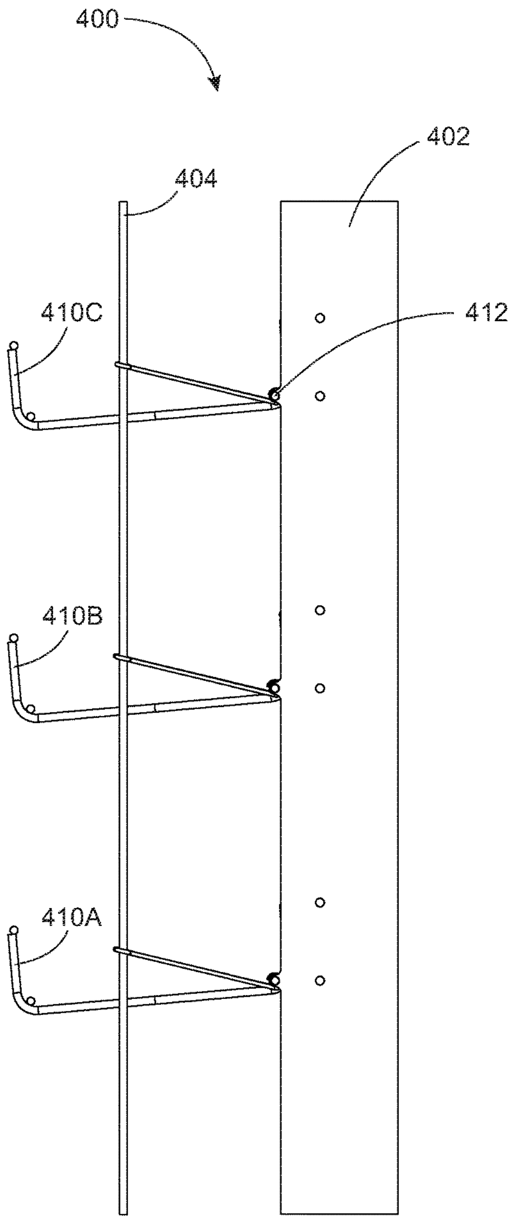
FIG. 7A shows a side view of the merchandise display rack of FIGS. 5 and 6 in an open position.
Figure 7B:
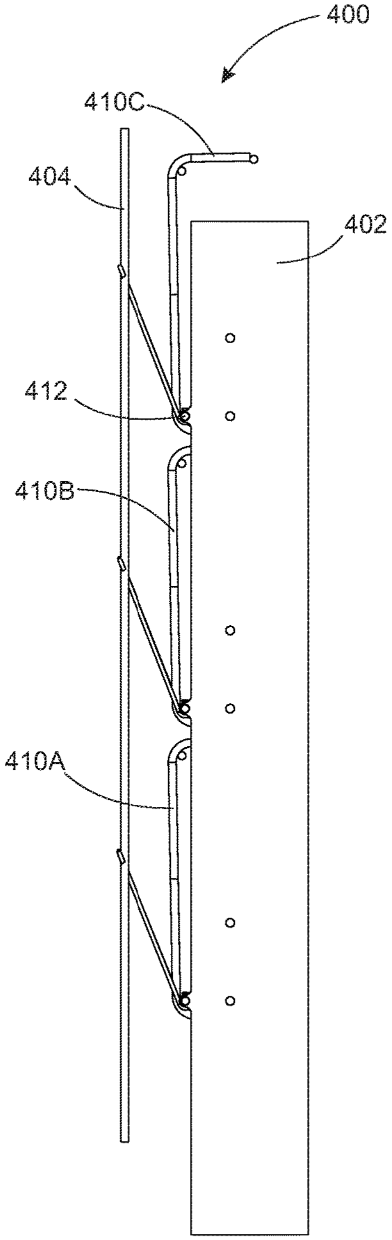
FIG. 7B shows a side view of the merchandise display rack of FIGS. 5 and 6 in a closed position.

Each shelf 410 may also be coupled to an elongated element 404A, B (generally, 404) such as a rod or the like. In preferred embodiments, a first elongated element 404A, also referred to as a bar pole, is coupled to a left right corner of each of the shelves 410 and a second elongated element 404B, also referred to as a bar pole, is coupled to a front right corner of each of the shelves 410. When the shelves 410 are folded, as shown in FIG. 7B, the elongated elements 404 move in a downward direction to open the shelves while remaining parallel to the mounting brackets 402, or register belt section walls in embodiments where mounting brackets 402 are not present. Conversely, when folding the shelves 410 the elongated elements move upward to lock the fixture in place under the belt region.

Figure 6:
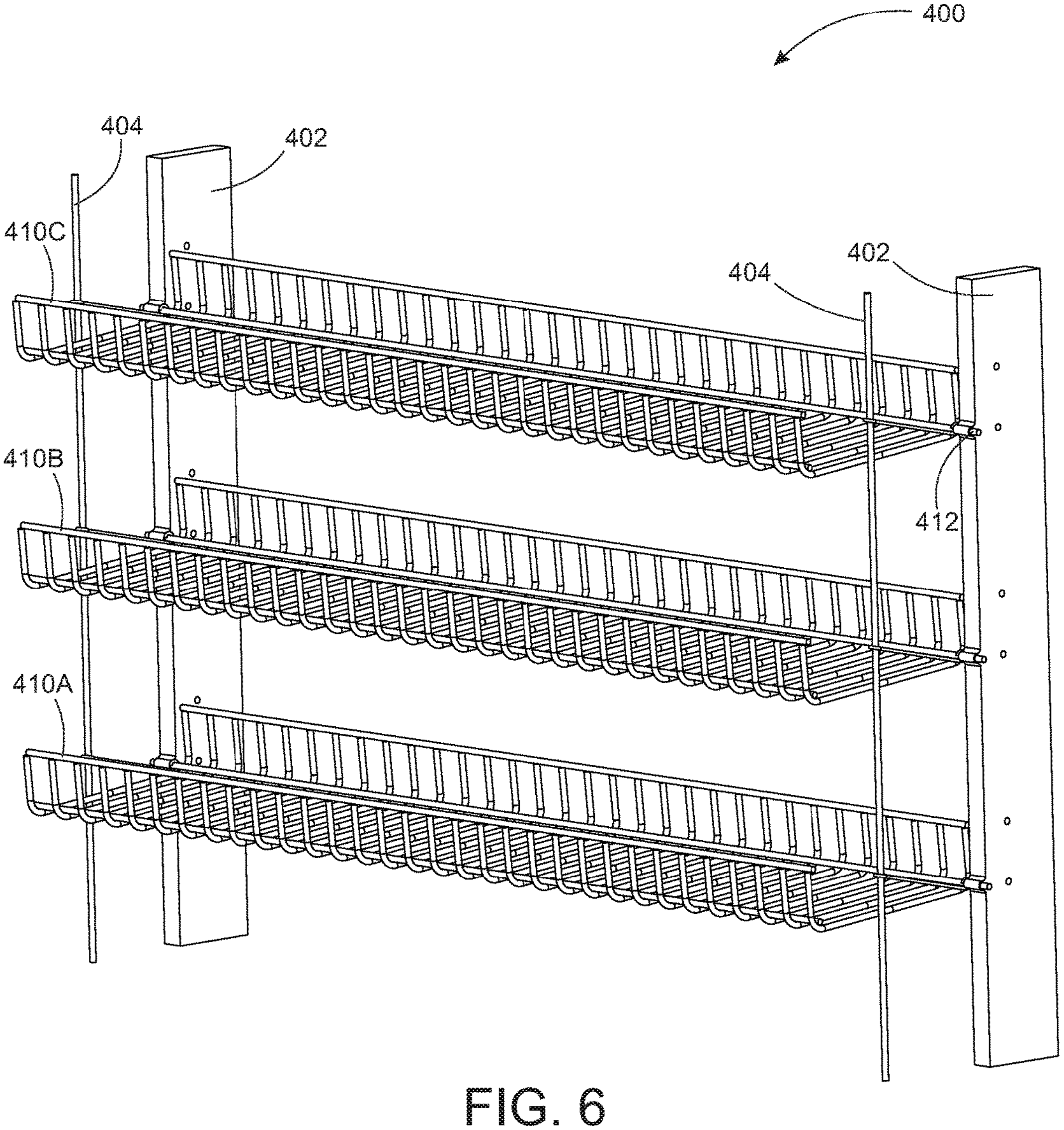
FIG. 6 shows a perspective view of the merchandise display rack of FIG. 5 separate from the self-checkout system.

In some embodiments a coupling 405 extends between a shelf 410 and an elongated element 404. For example, as shown in FIG. 6, six couplings 405 are provided: two couplings 405 per shelf 410. On each side of a shelf 410, a coupling 405 extends to a corresponding elongated element 404. The coupling 405 may include a pin 412 at one end for insertion into another mounting hole 407 in the mounting bracket 402. Therefore, the mounting bracket 402 can have a first mounting hole 403 for mating with a pin or other protruding portion of the shelf 410 and a second mounting hole 407 for mating with the coupling pin 405. Each mounting bracket 402 can have additional mounting holes, for example, four additional holes for receiving screws or other coupling devices for securing the mounting bracket 402 to the register belt station 20. The other end of the coupling 405 may include a coupling interface 413 for movably attaching to region of the elongated element 404. Each elongated element 404 may have a second coupling location including a hole 415 where a pin 416 extending from a bottom edge of each shelf 410 is inserted so that the shelf 410 may pivot about the elongated element 404 when the display rack 400 transitions between an open state and a closed state, shown in FIGS. 7A and 7B respectively. Therefore, each elongated element 404 may include two attachment locations for each shelf 410: a first hole or other pivotable location where the coupling interface 413 engages, and a second hole 415 or other pivotable location where the shelf 410, e.g., a shelf pin 416 engages.

In some embodiments, the display rack 400 includes a support center bar and two support hooks that lock the shelves 410 in place against the belt station 20 in a closed position. One or more hooks 414 may be provided along the shelves 410 to hold the display rack 400 in a closed position when not in use. At least one service bar may extend in a same longitudinal direction as the shelves 410 and between shelves to provide a support for the hooks 414 to lock the display rack 400 in a closed position as shown in FIG. 7B. Alternatively or in addition, the bar poles 404 may extend perpendicular to the shelves, for example, vertically, and lock under the belt station 20, for example, coupling to a locking device under the belt station 20.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A self-checkout system comprising:
- a register belt station;
- an itemization station downstream from the register belt station; and
- a bagging station downstream from, extending along, and abutting a side surface of the itemization station, wherein the register belt station, an itemization station, and bagging station are each modular and removably coupled to each other, wherein the bagging station includes an electrical housing for providing electrical connections and distributing electricity to each and all of the bagging station, the itemization station, and the register belt station, and wherein each of the bagging station, the itemization station, and the register belt station includes conduits for receiving the electrical connections provided from the electrical housing of the bagging station, wherein the bagging station comprises:
  - a self-checkout scale platform, and
  - wherein the bagging station is on a first region of the self-checkout scale platform between the itemization station and a second region of the self-checkout scale platform having a surface for measuring a weight of a plurality of store items placed in shopping bags hanging from the bagging station and removed from the bagging station and placed on the second region of the self-checkout scale platform for weighing the store items in the shopping bags, and wherein the bagging station rotates about an axis perpendicular to the scale platform, wherein the self-checkout scale platform weighs a plurality of store items in shopping bags hanging from the bagging station.

2. The self-checkout system of claim 1, wherein the bagging station includes:
- a modular interchangeable bagging station portion; and
- a base.

3. The self-checkout system of claim 2, wherein the bagging station portion includes:
- a carousel top having a top surface that is at a height lower than a top surface of the itemization station;
- a center piece extending from the carousel top to a height that is higher than the top surface of the itemization station; and
- a plurality of bag holding elements extending from the center piece, wherein at least one of the bag holding elements extends in a direction of a region above the top surface of the itemization station.

4. The self-checkout system of claim 3, wherein the bagging station portion further comprises:
- a bearing plate at a bottom surface of the carousel top; and
- an adapter plate in communication with the bearing plate, the bearing plate permitting the carousel top to rotate relative to the adapter plate.

5. The self-checkout system of claim 1, further comprising:

a weight calculator that compares a weight of the store items in the shopping bags hanging from the bagging station taking into account a weight of the bagging station on the first region of the self-checkout scale platform, and a weight of the items measured by the itemization station upstream from the bagging station.

6. The self-checkout system of claim 1, wherein the register belt station further comprises:

a housing positioned under a belt of the register belt station;

first and second bins positioned in the housing, the first bin for receiving garbage and/or recyclables, the second bin for receiving hangers; and at least one sliding rail extending perpendicular from a height of the housing, the first and second bins coupled to the at least one sliding rail, at least one of the first and second bins retracting or protruding from at least a portion of the housing in a first position and positioned entirely in the housing in a second position.

7. The self-checkout system of claim 6, wherein the register belt station further comprises a merchandise display rack that transitions between an open state and a closed state.

8. The self-checkout system of claim 1, further comprising a timing device that establishes a timing of a rotation of a belt of the register belt station, a checkout process performed by the itemization station, and a rotation of the bagging station by exchanging data from the timing device via the conduits of the bagging station, the itemization station, and the register belt station.

9. A self-checkout system comprising:

a register belt station;

a merchandise display rack coupled to the register belt station that folds in the register belt station to increase an available surface area under the register belt station when not in use;

an itemization station downstream from the register belt station; and a bagging station downstream from the itemization station, wherein the register belt station, an itemization station, and bagging station are each modular and removably coupled to each other, wherein the bagging station includes an electrical housing for providing electrical connections and distributing electricity to each and all of the bagging station, the itemization station, and the register belt station, and wherein each of the bagging station, the itemization station, and the register belt station includes conduits for receiving the electrical connections provided from the electrical housing of the bagging station, the self-checkout system further comprising:

a timing device that establishes a timing of a rotation of a belt of the register belt station, a checkout process performed by the itemization station, and a rotation of the bagging station by exchanging data from the timing device via the conduits of the bagging station, the itemization station, and the register belt station.

10. The self-checkout system of claim 9, wherein the merchandise display rack comprises:

at least one rack portion extending in a longitudinal direction between a first wall and a second wall of the register belt station;

a first pin that extends through a hole at the first wall; and a second pin that extends through the hole in the second wall, the first and second pins and the two holes extending along a same axis in the longitudinal direction;

the rack portion configured to pivot about the axis along which the first and second pins extend.

11. The self-checkout system of claim 10, wherein the merchandise display rack comprises: a mounting bracket that is coupled to each of the first wall and the second wall that extends in a vertical direction perpendicular to the longitudinal direction; the mounting bracket including the first and second holes for receiving the first and second pins or couplers, and wherein the mounting brackets each includes two additional holes for screws to couple the mounting brackets to the first and second wall, respectively.

12. A method for assembling a self-checkout system, comprising:

coupling a register belt station to one side of an itemization station; and coupling a bagging station to another side of the itemization station, wherein an item transfer path extends from the register belt station to the bagging station via the itemization station, wherein the bagging station includes an electrical housing for providing electrical connections and distributing electricity to each and all of the bagging station, the itemization station, and the register belt station, and wherein each of the bagging station, the itemization station, and the register belt station includes conduits for receiving the electrical connections provided from the electrical housing of the bagging station, the method further comprising: assembling the bagging station to include:

a self-checkout scale platform, wherein the bagging station is on a first region of the self-checkout scale platform between the itemization station and a second region of the self-checkout scale platform having a surface for measuring a weight of a plurality of store items placed in shopping bags hanging from the bagging station and removed from the bagging station and placed on the second region of the self-checkout scale platform for weighing the store items in the shopping bags, the method further comprising:

rotating the bagging station about an axis perpendicular to the scale platform, and weighing a plurality of store items in the shopping bags hanging from the bagging station.

13. The method of claim 12 further comprising assembling the bagging station to include:

a modular interchangeable bagging station portion, including:

a carousel top having a top surface that is at a height lower than a top surface of the itemization station;

a center piece extending from the carousel top to a height that is higher than the top surface of the itemization station; and a plurality of bag holding elements extending from the center piece, wherein at least one of the bag holding elements extends in a direction of a region about the top surface of the itemization station;

a bearing plate at a bottom surface of the carousel top; and an adapter plate in communication with the bearing plate, the bearing plate permitting the carousel top to rotate relative to the adapter plate.

14. The method of claim 12, further comprising, positioning a housing under the register belt station;

positioning first and second bins in the housing, the first bin for receiving garbage and/or recyclables, the second bin for receiving hangers; and extending at least one sliding rail perpendicular from a height of the housing, the first and second bins coupled to the at least one sliding rail, at least one of the first and second bins retracting or protruding from at least a portion of the housing in a first position and positioned entirely in the housing in a second position.

* * * * *